United States Patent
Cunningham et al.

(10) Patent No.: US 7,747,860 B2
(45) Date of Patent: Jun. 29, 2010

(54) SYSTEM AND METHOD FOR PREVENTING DELIVERY OF UNSOLICITED AND UNDESIRED ELECTRONIC MESSAGES BY KEY GENERATION AND COMPARISON

(75) Inventors: Brian Cunningham, Powhatan, VA (US); Leslie J. Kim, Boston, MA (US)

(73) Assignee: Message Level, LLC, Cambridge, MA (US)

( * ) Notice: Subject to any disclaimer, the term of this patent is extended or adjusted under 35 U.S.C. 154(b) by 979 days.

(21) Appl. No.: 11/010,600

(22) Filed: Dec. 13, 2004

(65) Prior Publication Data

US 2005/0251861 A1    Nov. 10, 2005

Related U.S. Application Data

(60) Provisional application No. 60/567,936, filed on May 4, 2004.

(51) Int. Cl.
*H04L 9/32* (2006.01)
*G06F 15/16* (2006.01)
(52) U.S. Cl. .................. 713/170; 709/206; 709/207
(58) Field of Classification Search ............ 713/170; 709/206, 207
See application file for complete search history.

(56) References Cited

U.S. PATENT DOCUMENTS

| | | | |
|---|---|---|---|
| 5,748,735 A | 5/1998 | Ganesan | |
| 5,878,136 A | 3/1999 | Kim et al. | |
| 5,884,033 A | 3/1999 | Duvall | |
| 5,999,932 A | 12/1999 | Paul | |
| 6,112,227 A | 8/2000 | Heiner | |
| 6,199,102 B1 | 3/2001 | Cobb | |
| 6,249,805 B1 | 6/2001 | Fleming | |
| 6,289,451 B1 * | 9/2001 | Dice | 713/168 |
| 6,321,267 B1 | 11/2001 | Donaldson | |
| 6,343,361 B1 | 1/2002 | Nendel et al. | |
| 6,393,465 B2 | 5/2002 | Leeds | |
| 6,421,709 B1 | 7/2002 | McCormick et al. | |
| 6,460,050 B1 | 10/2002 | Pace et al. | |

(Continued)

FOREIGN PATENT DOCUMENTS

WO    WO 01/10090 A1    2/2001

OTHER PUBLICATIONS

Product literature downloaded from the internet (www.habeas.com) regarding "Habeas Sender Warranted Email".

(Continued)

*Primary Examiner*—Christian Laforgia

(57) ABSTRACT

A sending device prepares a key for each electronic message sent by the device by applying an algorithm to specified data in the message and then incorporates the key in the message. A receiving device, upon receipt of an electronic message, locates the incorporated key and the data from which a sending device practicing the invention would have prepared it. The receiving device communicates a confirmation request to the purported sending device which contains the key and the data for its preparation. The sending device receives the confirmation messages and prepares a comparison key by applying the algorithm to the data in the confirmation request. The sending device replies to the confirmation request confirming that the sending device sent the message if the comparison key matches the key in the confirmation request and otherwise responds with a denial.

49 Claims, 3 Drawing Sheets

U.S. PATENT DOCUMENTS

| | | | |
|---|---|---|---|
| 6,539,430 | B1 | 3/2003 | Humes |
| 6,546,416 | B1 | 4/2003 | Kirsch |
| 6,609,196 | B1 | 8/2003 | Dickinson |
| 6,691,156 | B1* | 2/2004 | Drummond et al. ......... 709/206 |
| 6,782,516 | B2* | 8/2004 | Rittman et al. ................. 716/4 |
| 6,865,681 | B2* | 3/2005 | Nuutinen ..................... 726/14 |
| 6,986,049 | B2 | 1/2006 | Delany |
| 7,039,949 | B2* | 5/2006 | Cartmell et al. ................ 726/6 |
| 7,134,012 | B2 | 11/2006 | Ganesan |
| 7,249,175 | B1* | 7/2007 | Donaldson .................. 709/225 |
| 7,290,033 | B1* | 10/2007 | Goldman et al. ............ 709/206 |
| 2002/0029279 | A1 | 3/2002 | Campbell et al. |
| 2002/0046250 | A1 | 4/2002 | Nassiri |
| 2002/0059454 | A1 | 5/2002 | Barrett et al. |
| 2002/0129236 | A1* | 9/2002 | Nuutinen .................... 713/151 |
| 2002/0143710 | A1 | 10/2002 | Liu |
| 2002/0144154 | A1 | 10/2002 | Tomkow |
| 2002/0181703 | A1 | 12/2002 | Logan et al. |
| 2002/0198950 | A1 | 12/2002 | Leeds |
| 2003/0009698 | A1 | 1/2003 | Lindeman et al. |
| 2003/0043853 | A1 | 3/2003 | Doyle et al. |
| 2003/0065941 | A1 | 4/2003 | Ballard et al. |
| 2003/0070096 | A1 | 4/2003 | Pazi et al. |
| 2003/0167311 | A1 | 9/2003 | Kirsch |
| 2003/0182379 | A1 | 9/2003 | Henry |
| 2003/0187942 | A1 | 10/2003 | Quine et al. |
| 2003/0191799 | A1 | 10/2003 | Araujo et al. |
| 2003/0191969 | A1 | 10/2003 | Katsikas |
| 2003/0236847 | A1 | 12/2003 | Benowitz |
| 2004/0003283 | A1 | 1/2004 | Goodman |
| 2004/0015554 | A1 | 1/2004 | Wilson |
| 2004/0143740 | A1* | 7/2004 | Tsai ........................... 713/176 |
| 2004/0148358 | A1 | 7/2004 | Singh et al. |
| 2004/0181571 | A1 | 9/2004 | Atkinson et al. |
| 2004/0230657 | A1 | 11/2004 | Tomkow |
| 2004/0236838 | A1* | 11/2004 | Tout ........................... 709/207 |
| 2004/0249901 | A1 | 12/2004 | Wallace et al. |
| 2004/0260778 | A1 | 12/2004 | Banister et al. |
| 2005/0015455 | A1 | 1/2005 | Liu |
| 2005/0055410 | A1 | 3/2005 | Landsman et al. |
| 2005/0076090 | A1 | 4/2005 | Thuerk |
| 2005/0076220 | A1 | 4/2005 | Zhang et al. |
| 2005/0114516 | A1 | 5/2005 | Smith et al. |
| 2005/0144239 | A1 | 6/2005 | Mattathil |
| 2005/0172004 | A1 | 8/2005 | Fisher |
| 2005/0188045 | A1 | 8/2005 | Katsikas |
| 2005/0198158 | A1 | 9/2005 | Fabre et al. |
| 2005/0198173 | A1 | 9/2005 | Evans |
| 2005/0198511 | A1* | 9/2005 | Tomkow ..................... 713/176 |
| 2005/0210106 | A1* | 9/2005 | Cunningham ............... 709/206 |
| 2005/0251861 | A1 | 11/2005 | Cunningham |
| 2006/0031315 | A1 | 2/2006 | Fenton |
| 2007/0208941 | A1 | 9/2007 | Backer |

OTHER PUBLICATIONS

Bill McInnis, Re: [Asrg] Death, taxes and E-Postage, http://www.ietf.org/mail-archive/web/asrg/current/msg09864.html, Apr. 28, 2004.

Email Spoofing and Phishing Finally Has a Solution, Press Release, Jul. 29, 2004.

MessageLevel Added to IMail Server, http://www.thewhir.com/marketwatch/mes101304.cfm, Web Host Industry Review, Inc., Oct. 13, 2004.

Anti-Phising Through Sent E-mail Verifications, Press Release, http://products.datamation.com/security/anti-spam/1097682917.html, Oct. 13, 2004.

MessageLevel.com Archive, http://web.archive.org/web/*/http://www.messagelevel.com, Jul. 3, 2004-Nov. 30, 2004.

Brian Cunningham et al., Message Level Authentication Protocol—Overview Document, www.messagelevel.com, Nov. 17, 2004.

RFC2821, "Simple Mail Transfer Protocol," The Internet Society, Apr. 2001, pp. 1-79.

RFC2822, "Internet Message Format," The Internet Society, Apr. 2001, pp. 1-51.

Supplemental Search Report EP 05784143.9 dated Aug. 21, 2009, 8 pgs.

International Search Report and Written Opinion of International Searching Authority dated Nov. 18, 2005 for International Application No. PCT/US05/28510; 8 pgs.

Office Action issued Sep. 11, 2009 in Chinese Application No. 200580051709.3, 18 pgs.

Supplemental Search Report EP 05784288.2 dated Aug. 21, 2009, 8 pgs.

\* cited by examiner

SYSTEM AND METHOD FOR PREVENTING DELIVERY OF UNSOLICITED AND UNDESIRED ELECTRONIC MESSAGES BY KEY GENERATION AND COMPARISON

CROSS-REFERENCE TO RELATED APPLICATIONS

This application claims priority from U.S. Provisional Application No. 60/567,936, filed May 4, 2004, "Message Level Key Comparison."

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a system and a method for detecting and filtering unsolicited and undesired electronic messages by automatically verifying that the purported originator of the electronic message actually sent the message.

DESCRIPTION OF THE RELATED ART

Electronic communication is an essential tool in facilitating both business and personal communication. One form of electronic messaging, email, offers several advantages over traditional forms of communication. Email allows for the almost instantaneous exchange of information, it allows for the transmission of multiple messages at very little cost and it permits the transfer of large data files from one sender to another user. Nonetheless, the inherent nature of email gives rise to certain disadvantages. Most notable, and a topic of critical concern, is the increasing proliferation of unwanted and unsolicited email or "Spam."

Spam is unsolicited email that is typically transmitted to an extremely large number of email recipients. Spam is the electronic equivalent to "junk mail" received by traditional mail service. Generally, a Spam email is a commercial advertisement attempting to sell a product or service. Spam typically directs the recipient to take some action in order to purchase the product or service being advertised. This may be in the form of offering a phone number or a hyperlink in the text of the spam message which, when utilized by the recipient will place the recipient in contact with the seller of the goods or services. Spam is often, although not exclusively, utilized by entities marketing products or services outside the norm of traditional retailers and service providers. Some Spam messages contain information or graphics unsuitable for email users, particularly those who are children. However, Spam offers tremendous marketing benefits as it allows a retailer, marketer, or other sender to reach an incredibly large audience with a minimal economic expenditure.

Unfortunately, this benefit to the sender of Spam comes at a considerable cost to the unwilling recipients of Spam messages. Spamming costs companies millions of dollars in congested servers, expenses incurred employing measures to block the Spam email, and lost productivity due to email recipients having to wade through large amounts of Spam solicitations in order to find desired email. Further, Spam email provides an ideal medium for computer hackers to infect users' systems through the introduction of computer viruses and other malicious code.

Persons who desire to send Spam email are able to obtain email lists in a variety of ways. For example, email lists can be compiled from email addresses appearing on existing emails received by the sender or from users who provide their email address during electronic transactions. Additionally, lists of addresses are often compiled by third parties and sold in the same manner that traditional address lists have been sold.

According to one estimate, as of January 2004, Spam email constituted as much as 60% of all email traffic on the Internet ("Microsoft Sets Its Sights on Defeating Spam," National Public Radio, Morning Edition, Feb. 2, 2004). As Spam has become more plentiful, there has arisen a great demand for an effective and efficient method which will detect and block delivery of these unsolicited messages.

Spam email, like all email, originates from a Sending Email System. All electronic messages, including Spam email messages, contain various data elements in a header, an envelope or another designated portion of the electronic message that facilitate transfer of the message. These include, most especially, the addresses of the intended recipients of the message, the address of the originator of the message and the date and time when the message was prepared. For example, under Internet standard RFC 2821, "Simple Mail Transfer Protocol," the message envelope of an email contains various data elements including an originator address and one or more recipient addresses. Similarly, under standard RFC 2822, "Internet Message Format" an internet message header for an email must contain an origination date and an originator address and typically includes a destination address field.

An email address, whether an originator or a recipient address, typically takes the form of "user@domain name." For either originator or recipient addresses, the domain name portion of the email address identifies the host system to which or from which email is sent or received. The "user" portion of the address identifies the specified user and is assigned by the host system which, in the case of an originator address, transmits emails prepared by the specified user or, in the case of a recipient address, receives email messages for the specified user.

A host system sending an email transfers email to an intended recipient by referencing the Domain Name System ("DNS"). When the sending host system receives a prepared email message, it first identifies the domain name for each of the intended recipients. Through processes well known to those schooled in the art, the sending host system then utilizes the Domain Name System ("DNS") to determine the Internet Protocol (IP) address of the host system associated with each of the domain names in each of the recipient email addresses.

Next, the sending host system communicates with each host system associated with an intended recipient utilizing an email transfer protocol. For example, RFC 2821, "Simple Mail Transfer Protocol," ("SMTP") describes one protocol typically used for the transfer of electronic messages.

Although a sending host system could communicate with a receiving host system over any one of the more than 65,000 communication ports available to either system, by convention email transmissions are typically conducted through one or more designated ports. For example, the Internet Assigned Numbers Authority ("IANA") has designated communication ports numbered 0 through 1023 as System or Well Known Ports and further designated port 25 for Simple Mail Transfer. See http://www.iana.org/numbers.html. Accordingly, by convention most SMTP processes are conducted by electronic communications between a sending host system's port 25 and a receiving host system's port 25.

Where a host system comprises a plurality of email servers servicing a single domain name, the DNS system provides one or more IP addresses for access to any of the servers. Thus, where a receiving email system may receive messages by a plurality of email servers, any sender querying the DNS system will receive the same unique IP address or set of unique IP addresses for the domain name. When an email or other electronic communication is made to the IP address, the receiving email system, through processes well known to those schooled in the art directs the transmission to the appropriate server within the receiving system.

DNS data may be stored at the individual client machine level as well as at the host system level. Additionally, DNS name servers are available through the Internet for inquiries that cannot be satisfied at the client machine or host system level.

As noted earlier, one data element customarily included in an email message is the email address from which the email originated. For example, an email user who prepared a message conforming to RFC 2822 would include an originating email address in the "From:" email header field such as "From:user@domain.com" in which "domain.com" is the domain name from which the message originated. Optionally, an originating email address, including a domain name, may appear in the "Sender:" email header field.

One partially effective method of blocking Spam messages known by those schooled in the art is for a Receiving Email System to identify the domains from which Spam is known to originate and then to block any future emails which are sent with originating email addresses that have that same domain name. A Receiving Email System simply compiles a list of the domain names which have sent Spam messages. This list, or "blacklist," is thereafter, referenced by the Receiving Email System whenever an email is received. If the email originated from a domain name on the blacklist, the message is blocked from delivery.

Those skilled in the art will recognize that the inverse of this technique can be, and has, also been implemented. That is, a Receiving Email System may compile a list of trusted domain names, or a "whitelist." Thereafter, whenever a message is received by the Receiving Email System the whitelist is referenced. If the message originated from a domain name on the whitelist, the message is delivered.

Many Receiving Email Systems employ both whitelists and blacklists. If the source domain is recognized as a trusted system because it is listed on the whitelist, the email is delivered. If it is not, the Receiving Email System references a blacklist to determine whether the source has been identified as a source of Spam email and refuses delivery if it has been so identified.

Several services, such as SpamCop and MAPS, have been formed to compile, maintain and share the domain data of known spamming domains. These services allow Receiving Email Systems to reference large databases of known sources of Spam email compiled from many sources so that the Receiving Email System participating in the service may exclude email originating from a domain known to be a source of Spam email. This method of filtering unsolicited email has been implemented at both the user level, the Receiving Email System level, as well as the Internet Service Providers (ISP) level. As a matter of reference, it is estimated that ISP America On-Line blocks almost 2 billion messages per day from identified spamming systems.

However, an increasing amount of Spam is bypassing blacklist measures and capitalizing on whitelists by "spoofing" itself as having originated from legitimate domains. Spoofing occurs when a spamming system provides a false originating email address as a data element in the email or the email envelope. The domain name of the false address may be a legitimate domain name, such as "aol.com," "hotmail.com," or "msn.com," or it may be a fictitious domain name. Spammers falsify or "spoof" the originating email address in a Spam message in order to bypass blacklists that are blocking Spam and to hide their actual identity from Receiving Email Systems. Because there is A plethora of legitimate domain names from which legitimate email might originate, a spamming system utilizing spoofing has an almost unlimited ability to conceal its identity from Receiving Email Systems by frequently changing the domain name which it falsely provides as the source of the Spam messages being sent. As a matter of reference, it has been estimated that 70% of all Spam contains a spoofed originating email address.

Spoofing further compromises the ability of a Receiving Email System to use blacklists or whitelists to block Spam because of the potential for blocking legitimate and desired email transmissions. For example, a spammer may configure the spamming email system to send out Spam with an originating email address in the message header that identifies "hotmail.com" as the domain name from which the Spam email originated. In such a circumstance, email systems which receive these Spam messages and which utilize blacklists are faced with a dilemma. Although they could block all emails originating from the hotmail.com domain, this would have the undesirable effect of also blocking all non-Spam, desired emails coming from hotmail.com users.

Accordingly, if a Receiving Email System relies upon blacklists and whitelists only to block Spam it must either deliver spoofed Spam email or deny delivery of a significant amount of desired email. The first shortcoming occurs when a Spammer spoofs a domain name which exists on the Receiving Email System's trusted domain name list, that is, its whitelist. The second occurs when the Receiving Email System identifies a domain as a spamming domain and provides the domain data for that domain to a local or centrally maintained blacklist because the domain name was falsely shown as the originating domain for Spam email. Thereafter, when non-Spam email is originated from the domain and transmitted to the same Receiving Email System or to another Receiving Email System which references the same blacklist, the non-Spam email will be blocked.

The spoofing problem is further exacerbated by the inability of system administrators to identify all potential domain names from which non-Spam email might originate. Therefore, it has become increasingly difficult for system administrators to avoid blocking legitimate email while simultaneously stopping "spoofed" Spam because they cannot blacklist and block domain names that are heavily utilized by legitimate email senders and because they cannot be certain that some desired email will not be blocked if they add a previously unidentified spamming domain name to a blacklist.

One method for identifying Spam which has been spoofed is to compare the IP address of the Sending Email System transmitting the suspect email message with the IP address assigned to the domain name identified in the originator's email address. Customarily, when a Sending Email System transmits an email message, the Sending Email System identifies itself to the Receiving Email System during the transmission connection. For example, under RFC 2821, Simple Mail Transfer Protocol, the "Hello" command is used by the Sending Email System to identify itself to the Receiving Email System and the command line includes the domain name of the Sending Email System. One way, therefore, to determine whether a spoofed email is being transmitted is to determine the IP address of the domain name in the "Hello" command from DNS and to determine the IP address of the domain name for the domain name provided in the email address of the originator as set forth in the email or the email envelope. If the two IP addresses are the same, then the email message is presumptively non-Spam. However, if the two IP addresses are different, then the email is presumptively determined to be Spam.

This method, commonly referred to as "reverse MX record look-up" is somewhat effective in identifying Spam. However, where a spammer spoofs both the origination address provided in the email headers and envelopes, but also the domain name for the Sending Email System during the SMTP communication transaction, this method fails. Thus, a sophisticated spoofer may provide a false origination address that includes a valid domain name and also provide a false Sending Email System domain name or a false Sending Email System IP address during the SMTP transaction ensuring, however, that the false origination address and the false Sending Email System domain name or IP address are consistent. In this way, the spoofer may avoid detection of the Spam email by those administrators employing reverse MX record look-up.

Another method for identifying Spam which has been spoofed that is taught in the prior art is to analyze portions of the email message itself to determine whether the message is Spam. According to this method, suspected Spam email is electronically analyzed or "filtered" according to one or more algorithms which assess the content of various portions of the suspected email, including, for example, the subject line, other data elements in the header of the email, the contents of the message itself, or any combination of these.

Several types of these Spam filtering mechanisms are disclosed by the prior art. These systems permit a Receiving Email System to assess email messages to determine if they should be delivered. For example U.S. Pat. No. 5,999,932 (Paul '932) and U.S. Pat. No. 5,884,033 (Duvall '033) disclose varieties of filtering methods.

The Duvall '033 patent discloses a filtering system that, in part, compares portions of received email messages to information in a data system of information typically contained in Spam messages. The Duvall '033 system has the capability to search an email for a particular string of characters, and for a particular orientation of such characters, in order to determine whether a received email message is objectionable and should, therefore, be determined to be Spam.

The Paul '932 patent discloses a Spam filtering method in which multiple steps are performed. First, data from one or more data elements from an incoming email is compared with stored data. If the data properly cross-references, according to pre-determined criteria, the mail is delivered. If not, one or more additional heuristic techniques are executed in order to determine if the email is valid and should be delivered.

Unfortunately, these types of Spam filters suffer from serious drawbacks. Filtering programs typically require substantial processing capacity. Such programs require every suspected Spam message to be parsed and analyzed by the various algorithms employed by the program. Therefore, filtering programs may not be suitable for installation on a single email recipients' computer because the processing capacity of the computer is unlikely to be sufficient to operate the filtering program as well as other applications. However, even if the processing capacity of the Receiving Email System is substantial, it is still likely to be heavily taxed by a filtering program, particularly if the Receiving Email System receives a high volume of email and large number of suspected Spam messages.

Consequently, some organizations have built Filtering Email Systems, separate systems which receive incoming emails and process the email messages using filtering programs or other methods before transmitting them to the Receiving Email System for delivery. Where the utilization of a filtering program is preferred, the use of a Filtering Email System reduces the demand on the system resources of the Receiving Email System that would be encountered if the program was run on the Receiving Email System itself.

Even when a Filtering Email System is used, however, these filtering systems are inefficient and are unable to consistently filter out inappropriate email while permitting the delivery of valid email. This is true because the algorithms utilized, while complex, are not sufficiently sophisticated to fairly and fully analyze and assess message content. Moreover, Spammers can employ techniques, such as using broken words and numeric representations for letters in order to avoid detection by filtering programs. For example, "Viagra" could be entered as "Via gra" or "V1agra" in order to avoid detection.

In an attempt to overcome these drawbacks, Publication No. 2003/0009698 discloses a system for filtering Spam that relies upon the transmission of a "confirmation request" by the Receiving Email System to the purported sender. The confirmation request is a reply email automatically generated by the Receiving Email System in response to any incoming email that does not originate from a whitelisted source or that may be potentially classified as Spam. The reply email requests that the original sender manually acknowledge the confirmation request in order for the sender to become a "trusted source." This method relies on the inability of most spamming systems to respond to reply emails and the virtual impossibility that the spamming system could respond to a large number of them. If the confirmation email cannot be successfully delivered or if the system does not receive a reply to the request, then the Receiving Email System lists the mail as Spam and deletes it. Otherwise, if the Receiving Email System receives a reply, it adds the domain name to a trusted source list, or whitelist, and forwards the message to the intended recipient.

Other patents, such as U.S. Pat. No. 6,199,102 (Cobb '102) disclose similar systems that utilize some form of confirmation return email message. In the case of the Cobb '102 patent, the confirmation email contains a question which must be answered by the sender or requires the sender to perform some other cognitive task that cannot be performed by a computer. If no response or an inappropriate response is received the suspect email is blocked from delivery and deleted.

Although the Cobb '102 invention and the method of Publication No. 2003/0009698 provide advantages over filtering programs, they suffer three significant drawbacks. First, they require the original sender of the email communication to take additional action, that is, to reply to the confirmation message, prior to delivery of the first communication. This creates additional, and typically unexpected and undesired, work on the part of the original sender. Additionally, where the sender is unavailable or unwilling to send a reply, delivery of the message may be delayed or denied. Second, these methods typically deliver, without requiring sender confirmation, any email messages which have originated from whitelisted domain names. Thus, if a Spammer spoofs a domain name which is listed on the whitelist utilized by a Receiving Email System employing one of these methods, the Spam email will be delivered without requiring a sender confirmation message. Finally, these challenge email methods require a second email delivery, typically sent to the message originator which could itself prompt the preparation of a challenge email and so on, leading to a cascade of emails. Even if this cascade is preempted by some programmed interruption, however, the employment of this method still leads to a substantial increase in email traffic.

The method and system disclosed by U.S. Pat. No. 6,393,465 (Leeds '465) attempts to solve the foregoing problems by attaching a secret authorization code to each message. Users of the Leeds '465 system are provided with an authorization code by a third party "overseer." The code is included in all email communications. When a Receiving Email System receives email containing a code that is unrecognized, the Receiving Email System may verify that the email sender is not a spammer by checking with the third party overseer.

While the Leeds '465 system does reduce the strain on Receiving Email Systems, it is fallible because it requires that the secrecy and integrity of the authorization codes be maintained. If a Spammer is able to decipher a participant's authorization code, he can use the code to send Spam email without detection. Further, this system requires authentication by, and repeated communication with, a third-party authenticator. Additionally, users of this system are dependent upon a third party's representations that a particular Sending Email Server is not a spamming system.

There is the need, therefore, for a system and method for the detection and filtering of Spam email that can be performed by Sending and Receiving Email Systems without the intervention of senders or other persons and which does not excessively tax the processing resources of the mail servers. U.S. patent application Ser. No. 10/803,120 (Cunningham) solves these problems by a method and system in which a Receiving Email System automatically direct a confirmation request to a purported sender of an email message and the Receiving Email System automatically replies to such request so that unattended and automated confirmation of a suspect message can occur.

Although the invention of the Cunningham Application '120 accomplishes the stated goals, it does so by requiring all sending email systems practicing the invention to maintain a database with data for each message sent by the sending system. While this data might consist only of one or two data elements, e.g. the date and time of transmission and the email address of the intended recipients, the generation and maintenance of such a database may require substantial network and system resources. Further, recording some of this information may raise security or privacy concerns for senders and recipients of the electronic messages. There is a need, therefore, for a system and method that provides for automatic message verification without requiring that sending email systems maintain a database of data related to each message sent. The present invention addresses this need.

SUMMARY OF THE INVENTION

The present invention provides a system and a method for detecting and filtering undesired electronic messages by automatically verifying that the purported originator of a suspected message actually sent the message, so that unwanted and unsolicited electronic messages, particularly those with false originating address information, may be blocked from delivery.

The invention is a system that can be employed in conjunction with a variety of electronic message delivery and email protocols, including, for example, SMTP and SendMail. The system comprises a software module or Sending Module, which interacts with a device sending electronic messages, that is a Sending System and a second software module or Receiving Module, which interacts with a device receiving electronic messages, that is, a Receiving System. The first and second software modules of the invention can be developed and implemented in a variety of programming languages and can be deployed on a variety of electronic systems. The first and second modules comprise the necessary code to perform the functions associated with a Sending System and a Receiving System respectively.

According to the invention, when a Sending System transmits an electronic message for delivery, the Sending Module executes a pre-determined algorithm on one or more components of the message. The application of the algorithm to the message or portions thereof results in the generation of a data string or "key" for each particular message. Preferably, the algorithm would be run on data components which include the time and date that the message was prepared, data identifying the originator of the message, and data identifying the intended recipients of the message. Optionally, the key may also be derived from additional data contained within the electronic message or the message header. For example, in the case of an email message, the key may be derived from the body of the message text or from one or more data elements in the message header.

Those schooled in the art will recognize that an algorithm may be applied to a variety of data elements in order to generate a key that can be utilized to identify an electronic message. Regardless of the manner in which it is generated, this key is then incorporated into or associated with the electronic message in some fashion. Typically the key would simply be incorporated into the body of the message as text. However, those skilled in the art will recognize that such a key may be transmitted in the header of the message, in the "Message-ID" field, as an electronic file attachment or in some other manner.

According to the invention, when a "suspect electronic message" that is, an electronic message which the Receiving System cannot otherwise verify as authentic and desired, is received by a Receiving System, the Receiving Module withholds the suspect message from delivery. Next, the Receiving Module determines the identity of the Sending System from which the suspect message has purportedly been transmitted. This data may ordinarily be ascertained by referencing data in the suspect message, or, alternatively, from data in an envelope accompanying the message or from data transmitted during the transmission of the message. Next, the Receiving Module sends a confirmation request to the Sending System from which the suspect email has purportedly originated.

Those schooled in the art will recognize that, in the case of email messages; a Receiving Module can determine the Internet Protocol (IP) address of the purported Sending Email System by utilizing DNS in the same fashion that a Sending Email System utilizes DNS to determine the IP address for an email that it intends to send. Moreover, those schooled in the art will recognize that, in the event that a suspect email received by the Receiving Email System is a spoofed email, that is an email falsely identifying an originating email address with a domain name other than the system from which the email originated, the IP address provided to the Receiving Module by querying DNS will correspond to the domain name falsely identified as the originator and not the actual source for the email.

The confirmation request from the Receiving Module contains two elements, namely (1) the data string or "key" and (2) the components of the message that, by pre-arrangement within the communication system would have been used by a Sending System practicing the invention to prepare a key for a message.

When a Sending System receives a confirmation request from a Receiving Module, it communicates the confirmation request to the Sending Module. The Sending Module then reapplies the algorithm to the data components provided in the confirmation request and generates a second data string or "key." If the Sending Module finds that the second key is identical to the key transmitted in the confirmation request, the Sending Module replies to the confirmation request confirming that the Sending System transmitted the suspect message. If the Sending Module determines that the second key is not identical to the key found in the confirmation request, the Sending Module replies to the confirmation request denying that the Sending System transmitted the suspect message.

When the Receiving System receives a reply to the confirmation request affirming that the Sending System originated the suspect message, the Receiving Module releases the suspect message for delivery to the intended recipient. When the Receiving System receives a reply to the confirmation request denying that the Sending System originated the suspect message, the Receiving Module destroys the suspect email message or otherwise disposes of it according to the preferences of the administrator of the Receiving System.

Those skilled in the art will appreciate that each Sending System practicing the invention in the communication system does not have to apply the same algorithm to the data components which, by pre-arrangement within the system, are used to prepare a key. Additionally, a Sending System may optionally utilize different algorithms for different email messages, so long as the data components from which the key is prepared and which is forwarded in a confirmation request allow the Sending System to identify the algorithm that was used. For example, in a communication system where, by pre-arrangement a message key is prepared by applying an algorithm to the date and time stamp of the message, a Sending System could periodically change the algorithm which it applies. When a confirmation request is returned from a Receiving System, the Sending System would identify the algorithm used by reference to the data and time stamp returned in the confirmation request. Similarly, in a communication system where, by pre-arrangement a message key is prepared by applying an algorithm to the sender's email address, a Sending System could utilize different algorithms for various senders. When a confirmation request is returned from a Receiving System, the Sending System would identify the algorithm used by reference to the sender's email address returned in the confirmation request. In this way, the possibility that unauthorized users could identify and begin using the algorithm used by an authorized Sending System may be minimized.

Where the invention is practiced by systems transmitting email messages, the confirmation request and the reply to the confirmation request may be performed by port to port communication between a Receiving Email System and a Sending Email System. For example, the communication may be conducted through one of the Registered Ports, that is, a port in the range 1024 to 49151. If the electronic message does not contain a key or if when the Receiving System queries back to a Sending System it fails to receive a reply, the Receiving Module can neither affirm not deny that the email is Spam and may, optionally, further analyze the email using other filtering methods or deliver the email with a warning to the recipient that whether the email is Spam could neither be affirmed nor denied.

DETAILED DESCRIPTION OF THE PREFERRED EMBODIMENTS

The present invention provides a system and a method for detecting and filtering undesired electronic messages by automatically verifying that the purported originator of a suspected undesired message actually sent the message, so that unwanted and unsolicited messages, particularly those transmitted with false origination information, may be blocked from delivery. The description provided here is presented to enable one of ordinary skill in the art to make and practice the invention. However, various modifications to the preferred embodiment which is described will be apparent to those skilled in the art. Additionally, although the present invention is described in relation to the detection of Spam email messages, those skilled in the art will appreciate that the system and method described may also be applied to other forms of electronic communication including, for example, text messaging by cellular telephones or voice over Internet Protocol (VOIP) messaging.

Figure 1:
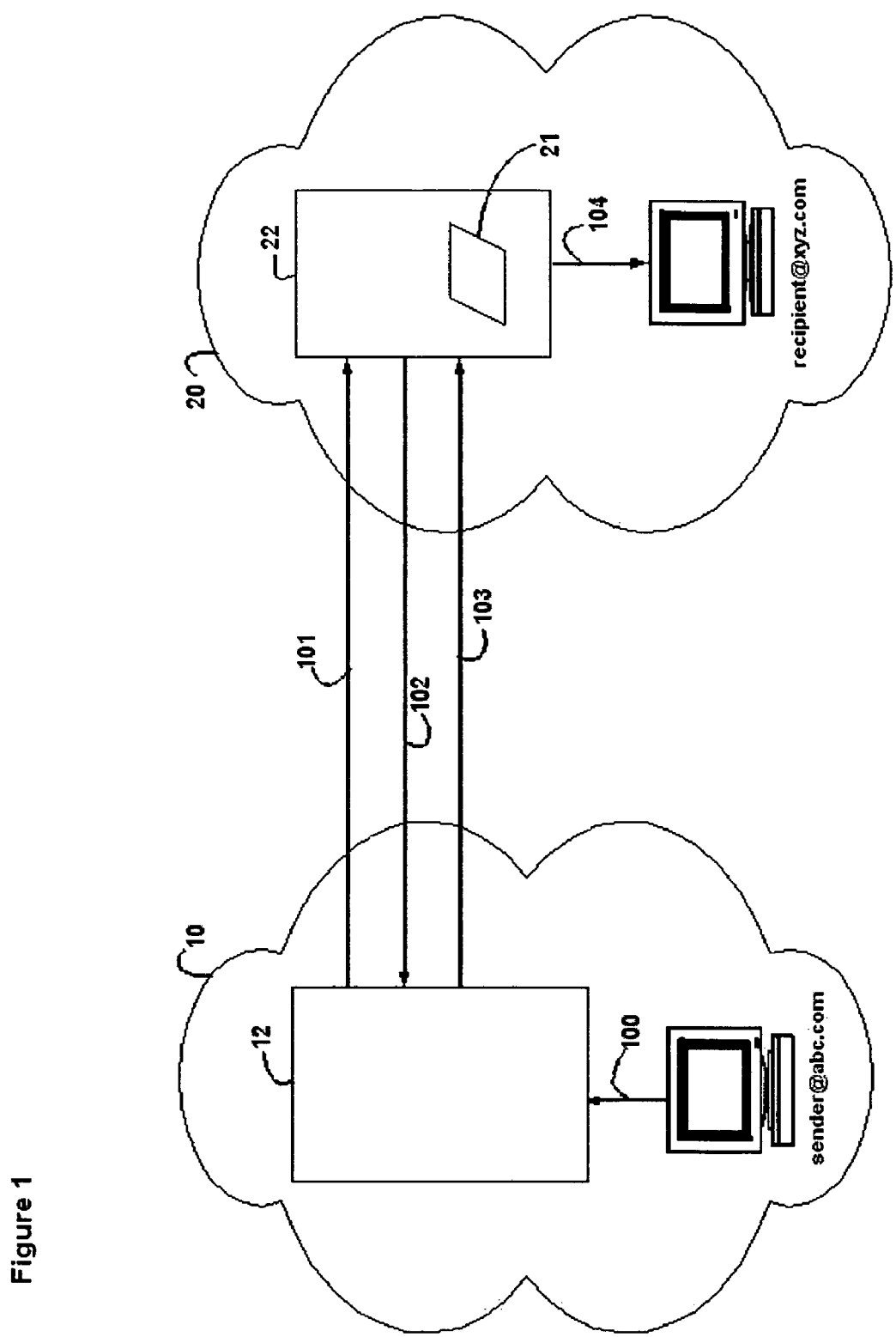
FIG. 1 is a schematic illustration of a Sending Email System and a Receiving Email System processing email according to the invention.

A preferred embodiment of the invention is shown in FIG. 1. A Sending Email System (10) servicing the domain name abc.com is disposed to send email messages prepared by users with email addresses including the domain name, abc-.com. The Sending Email System (10) is in communication with a Sending Module (12). A Receiving Email System (20) servicing the domain name xyz.com is disposed to receive and deliver email messages to users with email addresses including the domain name xyz.com. The Receiving Email System (20) is in communication with a Receiving Module (22).

Those schooled in the art will recognize that the Sending Email System may consist of a single computer running an email application (for example, Microsoft Outlook), an email server transmitting emails prepared by a plurality of users and serving one or more domain names, a plurality of email servers sending emails prepared by a plurality of users and serving one or more domain names, or a Relay Email System, that is, a system receiving emails from another Sending Email System and forwarding these with or without modification to a Receiving Email System. Similarly, those schooled in the art will recognize that the Receiving Email System may consist of a single computer running an email application, an email server, a plurality of servers, or a Gateway Email System.

Gateway Email Systems include those systems which receive and forward emails to a plurality of Receiving Email Systems and additionally, those which operate to forward messages received in one email transport environment to an email recipient in another email transport environment. For example, a Gateway Email System may operate to receive messages by SMTP and forward them to systems or users receiving messages in SendMail.

While for clarity of description of the invention the receiving and sending functions of each email system have been segregated, those schooled in the art will recognize that the sending and receiving functions may be and ordinarily are performed by a single computer serving as an email server.

Referring to FIG. 1, a Sending Email System (10) receives an email message (100) prepared by user with the email address sender@abc.com to be sent to a recipient with the email address recipient@xyz.com. Consistent with RFC 2822, "Internet Message Format", the sender's email address and the recipients' email address appear in the header portion of the email message at the header fields "From:" and "To" respectively. Additionally and also consistent with RFC 2822, the date and time which the message was prepared is inserted at the header "Date:"

Prior to the transmission of the prepared email message, the Sending Module (12) applies an algorithm to one or more components of the message. This process results in the generation of a first data string or "key" for the email being transmitted. Preferably, the key will be derived from the data contained in the header of the email including the sender's address, the recipient's address and the date and time when the email was prepared. The key may, however, be derived from any such components, portions or characteristics of the message including elements of the message text, the unique identifier included at the header "Message ID" or other data transmitted with the message. The key is then incorporated into the message or associated with the message in some fashion by the Sending Module. It will be recognized by those skilled in the art that the key may be incorporated through a variety of means, including, but not limited to, simple placement of the key in the body of the message, placement in the header or footer of the message or transmission of the key as a message attachment. By pre-arrangement within the communication system, all Sending and Receiving Systems practicing the invention in the system incorporate the key in the message in the same way and at the same location.

The email message is transmitted (101) by the Sending Email System via standard and well-known methods to the Receiving Email System (20) of the intended recipient. When the Receiving Email System (20) receives the email message or the suspect email, the Receiving Module (22) temporary withholds delivery of the suspect email by routing the suspect email into a temporary hold queue (21) while it performs the confirmation process.

During the confirmation process, the Receiving Module (22) locates and extracts the key from the message. If a Receiving Email System is unable to obtain a key for a particular suspect electronic message, for instance if the sender of such message is not practicing the instant invention, the authenticity of the origin of the suspect electronic message may not be determined. In that case, the Receiving Module (22) will take such additional action as is pre-determined by the operators of the Receiving System, such as deletion of the suspect message, delivery of the message to the intended recipient along with a warning to the recipient that whether the email is Spam could neither be affirmed nor denied, diversion to a specialized mailbox or processing through other spam filter systems in order to further analyze the suspect email.

When the Receiving Module (22) locates a key in the suspect message, the Receiving Module next determines the domain name in the originating email address from the message header of the suspect email. The Receiving Module (22) then prepares a confirmation request and transmits it (102) to the Sending Email System associated with the domain name identified as the source of the suspect email message. The confirmation request contains two elements: (a) the key from the suspect message; and (b) the data from the suspect message from which a key for the suspect message would have been prepared by a Sending System practicing the invention in the communication system.

When a confirmation request is received by the Sending Email System (10), the Sending Email System communicates the confirmation request to the Sending Module (12). The Sending Module (12) first extracts the data from the confirmation request corresponding to the data from the suspect message from which a key for the suspect message would have been prepared and had the message actually originated from the Sending Email System. The Sending Module (12) then applies the same algorithm to the extracted data that it would have applied to prepare a key for the suspect message had the message actually originated by the Sending System and generates a second key. Next, the Sending Module compares the first key submitted in the confirmation request with the second key. When the Sending Module determines that the two keys are identical, it replies to the confirmation request with an affirmation (103) that the Sending Email System (10) sent the suspect email. If the two keys are not identical, the Sending Module (12) replies to the confirmation request with a denial that the Sending Email System sent the suspect email.

Preferably, where the Sending Email System comprises at least one email server, the Receiving Email System communicates directly with the Sending Email System via port to port communications rather than by email transmission. For example, the communication may, by pre-arrangement between systems practicing the invention in the communications network, be conducted through one of the Registered Ports, that is, a port in the range 1024 to 49151.

Where the Sending Email System comprises a single client computer running an email application and which may be offline, it may be necessary for the Receiving Module to communicate with the Sending Module by specialized email communications. In such a circumstance, the Sending Module, by pre-arrangement with the Receiving Module, may include in the original email message data identifying the original email message as a transmission for which the confirmation request must be conducted by specialized email communication. Additionally, in this circumstance a confirmation request email includes data identifying the confirmation request email as a transmission for which a confirmation request should not be prepared.

When the Receiving Module receives a reply to the confirmation request that affirms that the Sending Email System sent the suspect email, the email is withdrawn from the temporary hold queue (21) and made available for delivery (104) to the recipient at the address recipient@xyz.com by the Receiving Email System (20).

Those skilled in the art will recognize that within a Sending Email System some functions of the Sending Module may be performed by different servers or computers. Thus, for example, a portion of the Sending Module operating on the client machine on which the email message is first prepared may apply an algorithm to the email message to generate a key and incorporate the key into the message. A second portion of the Sending Module, operating on a separate computer, that is, a Confirmation Server, may receive and reply to confirmation requests. In this case, when the Sending Email System receives a confirmation request from a Receiving Email System, the Sending Email System would route the confirmation request to the Confirmation Server and the Confirmation Server would apply the same algorithm used by the client machine which prepared the email message for which confirmation is requested.

Optionally, the Receiving Email System may generate a record for each domain name from which it has received a confirmation request reply from the Sending Email System servicing the domain name. In this case, when the Receiving Email System receives a suspect email message which does not contain a key but which is determined to have originated from a sender utilizing an address with a domain name from which an earlier message resulted in a confirmation request reply, the Receiving Email System would process the message as Spam in accordance with the preferences of the system administrator of the Receiving Email System. Similarly, within the communication system, a central registry of domain names which are serviced by Sending Email Systems practicing the invention may be maintained. In such a case, a Receiving Email System which receives a suspect email message which does not contain a key may compare the domain name of the sender in the suspect email message with the list of domain names in the central registry. If the comparison shows that the domain name from which the suspect message purportedly originated is serviced by a Sending Email System practicing the invention, the Receiving Email System would process the message as Spam in accordance with the preferences of the system administrator for the Receiving Email System.

Figure 2:
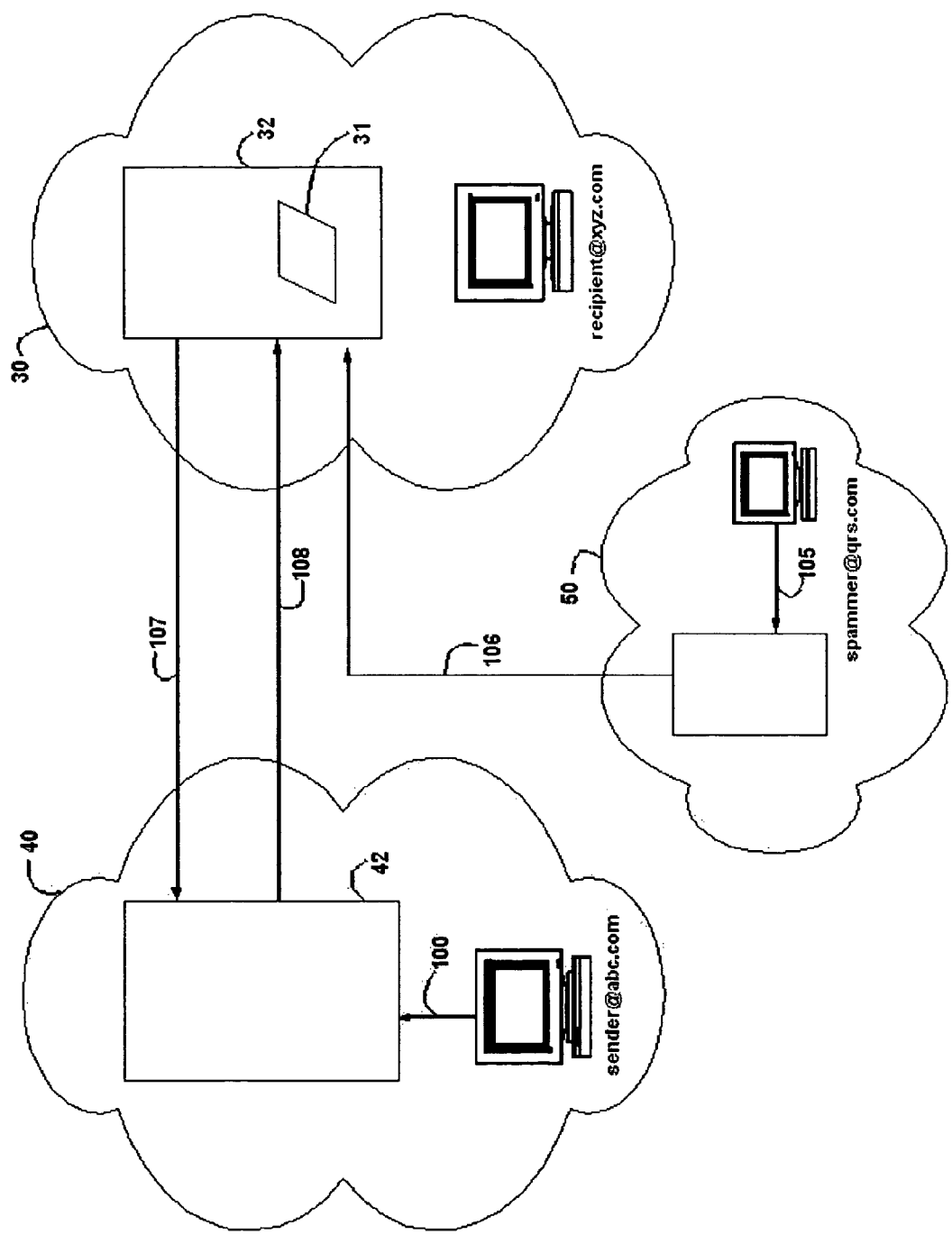
FIG. 2 is a schematic illustration of a Sending Email System and a Receiving Email System processing and filtering a spam email according to the invention.

FIG. 2 illustrates a preferred embodiment of the invention in operation to prevent the delivery of unsolicited and undesired Spam email. A Spamming Email System (50) is disposed to transmit Spam email messages. A Sending Email System (40) servicing the domain name abc.com is disposed to transmit email messages prepared by users with email addresses including the domain name, abc.com. The Sending Email System (40) includes a Sending Module (42). A Receiving Email System (30) servicing the domain name xyz.com is disposed to receive and deliver email messages to users with email addresses including the domain name xyz.com. The Receiving Email System (30) includes a Receiving Module (32).

Referring to FIG. 2, a Spammer at email address spammer@qrs.com prepares a Spam email to be sent to recipient at email address recipient@xyz.com and sends it (105) to the Spamming Email System (50). However, in order to avoid detection, Spammer inserts a false origination address, sender@abc.com in the header of the Spam email message. In addition to the false origination address, the recipients' email address also appears in the header portion of the email message. The Spam email message also contains date and time data inserted by the Spammer at the header field, "Date:". In a further attempt to circumvent anti-spam systems, the Spammer may include a false data string or false "key."

The Spam email message is transmitted (106) by the Spamming Email System (50) via standard and well-known methods to the Receiving Email System (30) of the intended recipient. When the Receiving Email System (30) receives the Spam email message or the suspect email, the Receiving Module (32) temporary suspends delivery of the suspect email by routing the suspect email into a temporary hold queue (31) while it performs the confirmation process.

During the confirmation process, the Receiving Module (32) first determines if a key is present in the message. If the Receiving Module is unable to locate a key then the Receiving Module can neither affirm not deny that the email is Spam. In that case, the Receiving Module may, optionally, pass the email to one or more other processing systems in order to further analyze the email using other filtering methods or it may deliver the email with a warning to the recipient that whether the email is Spam could neither be affirmed nor denied. If, however, the Receiving Module identifies the false key provided by the spammer as a key, the Receiving Module may prepare a confirmation request. Therefore, the Receiving Module determines the domain name for the purported originating email address from the message header of the suspect email. Because the Spammer has falsely provided sender@abc.com as the originating email address, the Receiving Module (32) will determine that abc.com is the domain name of the originating domain. Next, the Receiving Module (32) prepares a confirmation request and transmits it (107) to the domain, abc.com, identified as the source of the suspect email message. The confirmation request contains two elements, namely (1) the false key from the suspect message and (2) the data from the suspect message from which a key for the suspect message would have been prepared by a Sending System practicing the invention in the communication system.

When a confirmation request is received by the Sending Email System (40), the Sending Email System communicates it to the Sending Module (42). The Sending Module (42) then applies the algorithm that it would have applied to a message in order to prepare a key had the message been originated by it and generates a second key. The Sending Module then compares the second key to the false key found in the confirmation request. When the Sending Module determines that the keys are not identical, the Sending Module (42) replies to the confirmation request with a denial (108) that the Sending Email System transmitted the suspect email.

When the Receiving Module receives a reply to the confirmation request that denies that the Sending Email System transmitted the suspect email, the Receiving Module (32) destroys the suspect email message or otherwise disposes of it according to the preferences of the administrator of the Receiving Email System.

In the preferred embodiment of the system which is described, the respective Receiving and Sending Modules communicate with one anther via port to port communications. Where the Sending Email System comprises a single client computer running an email application which may be offline, it may be necessary for the Receiving Module to communicate with the Sending Module by specialized email communications. In such a circumstance, the Sending Module, by pre-arrangement with the Receiving Module, may include in the original email message data identifying the original email message as a transmission for which the confirmation request must be conducted by specialized email communication. Additionally, in this circumstance a confirmation request email includes data identifying the confirmation request email as a transmission for which a confirmation request should not be prepared.

Where the Receiving Module (32) attempts to communicate a confirmation request to a Sending Email System that is not practicing the invention (not shown), the Receiving Module will either be denied access to the port for such confirmation requests or, alternatively, will be granted access but fail to receive an appropriate response from the Sending Email System. When this occurs the Receiving Module may, optionally, release the email for delivery to the intended recipient, may append data to the email informing the recipient that it was unable to confirm or deny that the email was Spam or may process the email according to other Spam detection methods.

Communication between Sending and Receiving Modules may also occur by Secure Sockets Layer protocols and, where additional security is desired, the communications may be encrypted and decrypted according to methodologies commonly known in the art.

Figure 3:
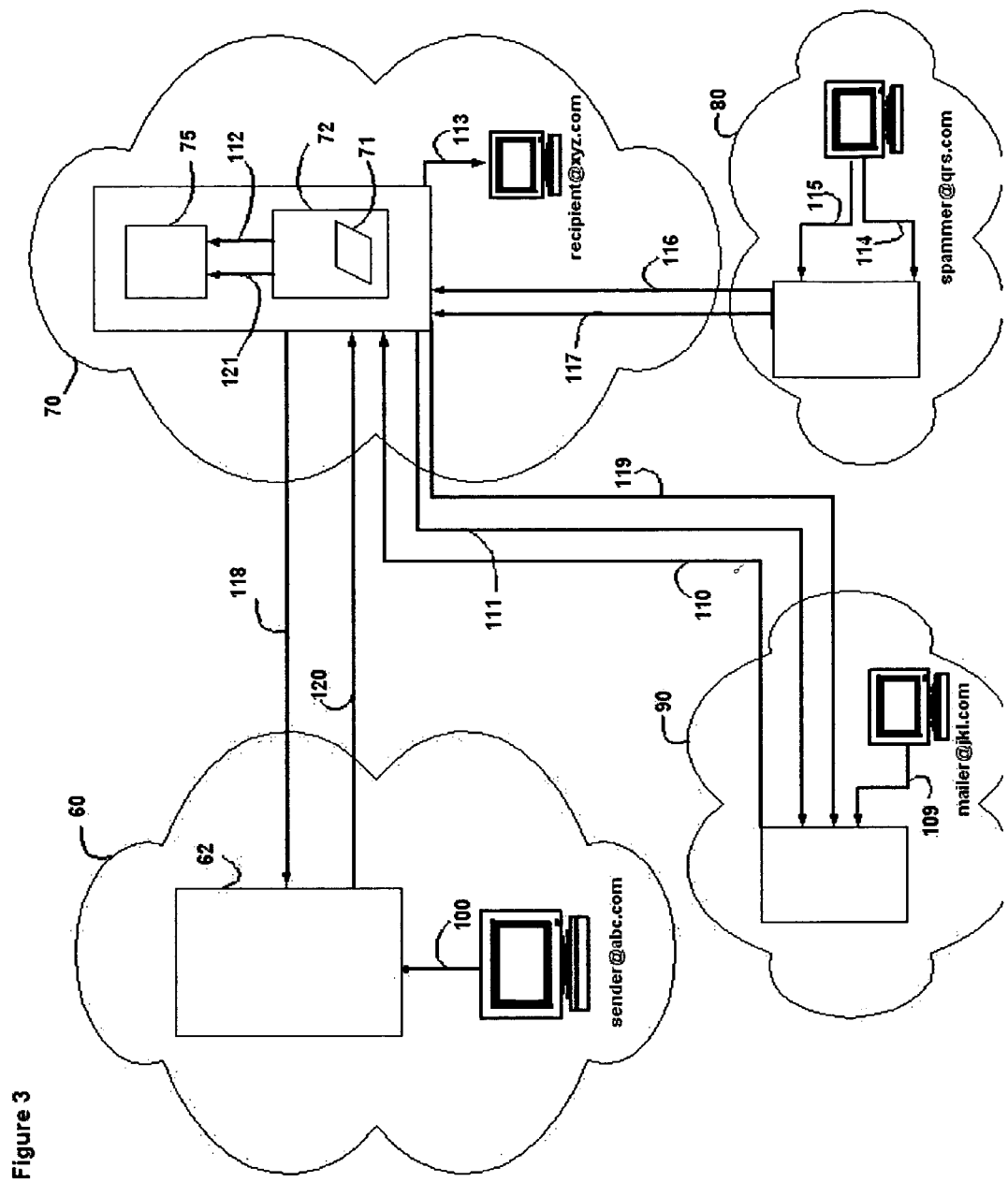
FIG. 3 is a schematic illustration of plural Sending Email Systems and a Receiving Email System processing and filtering spam emails according to the invention and in conjunction with a spam filter.

The invention may also be practiced in combination with one or more alternate methods for detecting and filtering Spam e-mail. FIG. 3 illustrates a preferred embodiment of the invention in operation in conjunction with a Spam filter. A Spamming Email System (80) is disposed to transmit Spam email messages. A Sending Email System (60) servicing the domain name abc.com is disposed to transmit email messages prepared by users with email addresses including the domain name, abc.com.

A Receiving Email System (70) servicing the domain name xyz.com is disposed to receive and deliver email messages to users with email addresses including the domain name xyz.com. The Receiving Email System (70) includes a Receiving Module (72) and a Spam filter module (75) disposed to parse and analyze suspect email messages according to one or more algorithms.

A second Sending Email System (90) servicing the domain name jkl.com is disposed to transmit email messages prepared by users with email addresses including the domain name, jkl.com.

Referring to FIG. 3, the second Sending Email System (90) receives an email message (109) prepared by user mailer@jkl.com to be transmitted to recipient at email address recipient@xyz.com. The sender's email address and the recipients' email address appear in the header portion of the email message. Additionally, the time and date the message was prepared is presented in the header of the email.

The email message is transmitted (110) by the Sending Email System via standard and well-known methods to the Receiving Email System (70) of the intended recipient. When the Receiving Email System (70) receives the email message or the suspect email, the Receiving Module (72) temporary suspends delivery of the suspect email by routing the suspect email into a temporary hold queue (71) while it performs the confirmation process. The Receiving Module is unable to locate a key in the suspect email, and, therefore, it removes the suspect email from the temporary hold queue (71) and forwards (112) the suspect email to the Spam filter module (75) for parsing and analysis.

In the alternative, if the Receiving Module locates data that it improperly identifies as a key, the Module then prepares a confirmation request. In that case, the Receiving Module (72) first determines the domain name for the originating email address from the message header of the suspect email. Next, the Receiving Module (72) prepares a confirmation request and transmits it (111) to the domain identified as the source of the suspect email message. The confirmation request contains: (a) the information improperly identified as a key, and: (b) the data from the suspect message from which a key for the suspect message would have been prepared by a Sending System practicing the invention in the communication system. Because the second Sending Email System (90) is not practicing the invention, the second Sending Email System (90) does not reply to the confirmation request.

Preferably, the confirmation request is transmitted to the Sending Email System (90) via port to port transmission over a port which by pre-arrangement has been designated for the communication of confirmation requests by Sending Email Systems practicing the invention in the communication network. When the Receiving Module (72) fails to communicate with the Sending Email System (90) or fails to receive an appropriate response to the confirmation request from the Sending Email System (90), the Receiving Module (72) removes the suspect email from the temporary hold queue (71) and forwards (112) the suspect email to the Spam filter module (75) for parsing and analysis.

The Spam filter module (75) processes the suspect email according to one or more Spam detection methods. When the Spam filter module (75) determines that the suspect email is not Spam email, the message is made available for delivery (113) to the intended recipient at recipient@xyz.com.

Similarly and again referring to FIG. 3, a Spammer at email address spammer@qrs.com prepares two Spam email messages to be sent to recipient at email address recipient@xyz.com. In order to avoid detection, the Spammer inserts a false origination address, sender@abc.com, in the header of the first Spam email message and also incorporates a first false key in the message and sends it (114) to the Spamming Email System (80). The Spammer inserts a second false origination address, mailer@jkl.com, in the header of the second Spam email message and also incorporates a second false key in the message and sends it (115) to the Spamming Email System. In addition to the false origination addresses, the recipients' email addresses and the date and time the email messages were prepared also appear in the header portion of the Spam email messages.

The first Spam email message is transmitted (116) by the Spamming Email System via standard and well-known methods to the Receiving Email System (70) of the intended recipient. When the Receiving Email System (70) receives the first Spam email message or the first suspect Spam email, the Receiving Module (72) temporary suspends delivery of the first suspect Spam email by routing the first suspect Spam email into the temporary hold queue (71) while it performs the confirmation process. Similarly, the second Spam email message is transmitted (117) by the Spamming Email System via standard and well-known methods to the Receiving Email System (70) of the intended recipient. When the Receiving Email System receives the second Spam email message or the second suspect Spam email, the Receiving Module (72) temporary suspends delivery of the second suspect Spam email by routing the second suspect Spam email into the temporary hold queue (71) while it performs the confirmation process.

During the confirmation process, the Receiving Module (72) first determines the domain names for the originating email addresses from the message headers of the first and second suspect Spam emails. Because the Spammer has falsely provided sender@abc.com as the originating email address for the first suspect Spam email and mailer@jkl.com as the originating email address for the second suspect Spam email, the Receiving Module (72) will determine that abc.com is the domain name of the originating domain for the first suspect Spam email and that jkl.com is the domain name of the second suspect Spam email.

Next, the Receiving Module (72) prepares a first confirmation request and transmits it (118) to the Sending Email System (60) servicing the domain, abc.com, which is identified as the source of the first suspect Spam email. The first confirmation requests contains the first false key from the first suspect message and the data from the first suspect message from which a key for the first suspect message would have been prepared by a Sending System practicing the invention in the communication system.

Similarly, the Receiving Module (72) also prepares a second confirmation request and transmits it (119) to the Sending Email System (90) servicing the domain, jkl.com, which is identified as the source of the second suspect Spam email. The second confirmation request contains the second false key from the second suspect message and the data from the second suspect message from which a key for the suspect message would have been prepared by a Sending System practicing the invention in the communication system.

When the first confirmation request is received by the Sending Email System (60) servicing the domain, abc.com, the Sending Email System communicates the request to the Sending Module (62). The Sending Module (62) then applies the algorithm that it would have applied to a message in order to prepare a key had the message been originated by it and generates a second key. The Sending Module (62) then compares the second key to the first false key found in the confirmation request. When the Sending Module determines that the keys are not identical, the Sending Module (62) replies to the confirmation request with a denial (120) that the Sending Email System (60) servicing abc.com sent the suspect email.

When the Receiving Module receives a reply to the confirmation request that denies that the Sending Email System sent the first suspect Spam, email, the Receiving Module (72) destroys the first suspect Spam email message or otherwise disposes of it according to the preferences of the administrator of the Receiving Email System.

Preferably, the confirmation request and the reply to the confirmation request are transmitted to the via port to port transmission over a port which by pre-arrangement has been designated for the communication of confirmation requests by Receiving and Sending Email Systems practicing the invention in the communication network.

Since the Sending Email System (90) servicing the domain jkl.com is not practicing the invention, the Receiving Email System (70) will either not be able to communicate via the designated port with the Sending Email System (90) or it will fail to receive an appropriate response to the confirmation request. When the Receiving Module (72) fails to communicate with the Sending Email System (90) or fails to receive an appropriate response to the confirmation request from the Sending Email System (90), the Receiving Module (72) removes the second suspect email from the temporary hold queue (71) and forwards (121) the suspect email to the Spam filter module (75) for parsing and analysis. The Spam filter module (75) processes the second suspect email message according to one or more Spam detection methods. When the Spam filter module (75) determines that the suspect email is Spam email, the Spam filter module (75) destroys the second suspect Spam email message or otherwise disposes of it according to the preferences of the administrator of the Receiving Email System.

In the embodiments illustrated thus far, the Sending Module is an integral part of a Sending Email System although the functions of the Sending Module may be distributed among a plurality of computers within the Sending Email System. Those skilled in the art will also recognize that the Sending Module functions may also be performed by a Confirming Email System operating independent from the Sending and Receiving Email Systems.

In an alternate embodiment (not shown in the drawings hereto), the confirmation process may be carried out by the Receiving Email System rather than by the Sending Email System. In such an embodiment, all parties practicing the invention in the communication system, by pre-arrangement, apply the same algorithm to specified data of the message and to "seed data" to prepare a key. The "seed data" is additional data, unrelated to the content of the message, selected by the Sending Email System. Thus, using the seed data and the specified data from each message to be transmitted, the Sending Module of the Sending Email System prepares and incorporates a key into each message transmitted by the system. Upon receiving the message, the Receiving Module of a Receiving Email System would communicate with the Sending Module of the purported sender of the message in order to obtain the seed data for a message sent by the purported Sending Email System. The Sending Module provides this data in a reply communication to the Receiving Module. This allows the Receiving Module to apply the algorithm to the data from the message and the seed data in order to compute a second key. The Receiving Module may then compare the second key to the key in the suspect message to determine whether the message was originated by the Sending Email System.

The seed data selected by the Sending Email System may be varied for specified time periods or may be varied based upon specified data in the email messages, so long as by pre-arrangement, communications from Receiving Modules requesting seed data include the date and time stamp of the suspect message or the specified data of the suspect message that will allow the Sending Email System to determine and reply with the appropriate seed data. For example, if the Sending Email System varies the seed data according to the date and time the message was forwarded, the Receiving Module's request for seed data must include the date and time stamp for the suspect message. The Sending Module may then determine the seed data for an email sent at the specified date and time.

While the invention has been described in reference to certain preferred embodiments, it will be readily apparent to one of ordinary skill in the art that certain modifications or variations may be made to the system without departing from the scope of invention claimed below and described in the foregoing specification.

We claim:

1. A method comprising:
   sending to an intended recipient a first electronic message containing information identifying a purported originator of the first electronic message, and further containing a first data string generated by application of an algorithm to a portion of said first electronic message;
   receiving a second electronic message that includes a request to confirm that said first electronic message was authorized by the purported originator identified in the first electronic message, said second electronic message including said first data string and said portion of said first electronic message;
   generating a second data string, different from said first data string, by application of an algorithm to said portion of said first electronic message;
   comparing said first data string to said second data string; and
   upon determining that said first data string matches said data string, responding to said second electronic message, affirming said purported originator of said first electronic message did not use a false originating address;
   wherein the algorithm applied to the portion of the first electronic message is selected from a plurality of algorithms based on a time associated with the first electronic message.

2. The method of claim 1, wherein said electronic message includes one of an email, text message, VoIP message, or instant message.

3. The method of claim 1, wherein said portion of said electronic message includes information contained in one or more of a message header, a message text, and a timestamp, of said electronic message.

4. The method of claim 1, wherein said first data string is included in a message header of said electronic message.

5. The method of claim 1, wherein said identification data is included in a message text of said electronic message.

6. The method of claim 1, wherein said identification data is included as an attachment to said electronic message.

7. The method of claim 1, wherein said receiving a confirmation request includes receiving said confirmation request via port-to-port communication.

8. The method of claim 1, wherein said electronic message is a first electronic message and said confirmation request is a second electronic message, said second electronic message including said portion of said first electronic message.

9. The method of claim 8, wherein said second electronic message includes one of an email, text message, VoIP message, or instant message.

10. The method of claim 1, wherein said responding to said confirmation request includes responding via port-to-port communication.

11. The method of claim 1, wherein said responding to said confirmation request includes responding with a return electronic message.

12. The method of claim 11, wherein said return electronic message is one of an email, text message, VoIP message, or instant message.

13. The method of claim 1, wherein said comparing is performed at a device different from a device at which said sending is performed.

14. The method of claim 1, wherein said first data string is an alphanumeric string.

15. The method of claim 1, further comprising:
prior to said sending to an intended recipient, generating said first data string by application of an algorithm to said portion of said electronic message, and
wherein said sending to an intended recipient is performed at the same location as said generating.

16. The method of claim 1, wherein said sending to an intended recipient excludes sending said first electronic message to any entity other than an intended recipient.

17. The method of claim 1, wherein said first data string is generated by application of an algorithm only to said portion of said electronic message.

18. A method comprising:
receiving a first electronic message that includes a request to confirm that a second electronic message sent to an intended recipient was sent on behalf of an originator identified in the second electronic message, the first electronic message including a first data string purportedly generated by application of an algorithm to a portion of said second electronic message and further including said portion of said second electronic message;
generating a second data string, different from said first data string, by application of an algorithm to said portion of said second electronic message included in said first electronic message;
comparing said first data string to said second data string; and
upon determining that said first data string does not match said second data string, responding to said first electronic message, denying said second electronic message was sent on behalf of the originator identified in the second electronic message due to the originator using a false originating address;
wherein the algorithm applied to the portion of the first electronic message is selected from a plurality of algorithms based on a time associated with the first electronic message.

19. The method of claim 18 wherein said second electronic message includes one of an email, text message, VoIP message, or instant message.

20. The method of claim 18 wherein said portion of said second electronic message includes information contained in one or more of a message header, a message text, and a timestamp, of said electronic message.

21. The method of claim 18 wherein said first data string is included in a message header of said second electronic message.

22. The method of claim 18 wherein said first data string is included in a message text of said second electronic message.

23. The method of claim 18 wherein said first data string includes a checksum for a message text of said second electronic message.

24. The method of claim 18 wherein said receiving a first electronic message includes receiving said first electronic message via port-to-port communication.

25. The method of claim 18 wherein said responding to said first electronic message includes responding via port-to-port communication.

26. The method of claim 18 wherein said responding to said first electronic message includes responding with a return electronic message.

27. The method of claim 26, wherein said return electronic message is one of an email, text message, VoIP message, or instant message.

28. The method of claim 18, wherein said receiving a first electronic message is performed by a confirming device, said confirming device receiving said portion of said second electronic message only with said first electronic message.

29. A method comprising:
receiving a first electronic message that includes a request to confirm that a second electronic message sent to an intended recipient was sent on behalf of an originator identified in the second electronic message, the first electronic message including a first data string generated by application of an algorithm to a portion of said second electronic message and further including said portion of said second electronic message;
generating a second data string, different from said first data string, by application of an algorithm to said portion of said second electronic message included in said first electronic message;
comparing said first data string to said second data string; and
upon determining that said first data string matches said data string, responding to said first electronic message, affirming said originator identified in the second electronic message did not send said second electronic message from a false originating address;
wherein the algorithm applied to the portion of the first electronic message is selected from a plurality of algorithms based on a time associated with the first electronic message.

30. The method of claim 29 wherein said second electronic message includes one of an email, text message, VoIP message, or instant message.

31. The method of claim 29 wherein said portion of said second electronic message includes information contained in one or more of a message header, a message text, and a timestamp, of said electronic message.

32. The method of claim 29 wherein said first data string is included in a message header of said second electronic message.

33. The method of claim 29 wherein said first data string is included in a message text of said second electronic message.

34. The method of claim 29 wherein said first data string includes a checksum for a message text of said second electronic message.

35. The method of claim 29 wherein said receiving a first electronic message includes receiving said first electronic message via port-to-port communication.

36. The method of claim 29 wherein said responding to said first electronic message includes responding via port-to-port communication.

37. The method of claim 29 wherein said responding to said first electronic message includes responding with a return electronic message.

38. The method of claim 37, wherein said return electronic message is one of an email, text message, VoIP message, or instant message.

39. The method of claim 29, wherein said receiving a first electronic message is performed by a confirming device, said confirming device receiving said portion of said second electronic message only with said first electronic message.

40. A method comprising
receiving from a sending device a first electronic message authorized by an originator and directed to an intended recipient, said electronic message containing an identifier associated with the originator and further containing a first data string generated by application of an algorithm to a portion of said first electronic message;
sending to a confirmation device a second electronic message that includes a request to confirm that said first electronic message was authorized by the originator associated with the identifier, said second electronic message including said first data string and said portion of said electronic message;
receiving from the confirmation device a response to said second electronic message affirming said originator of said first electronic message did not use a false originating address;
allowing said first electronic message to be further processed according to rules for processing of confirmed electronic messages directed to the intended recipient;
receiving from the sending device a third electronic message authorized by the originator, said third electronic message containing the identifier and further containing a second data string generated by application of an algorithm to a portion of said third electronic message; and
sending to the confirmation device a fourth electronic message that includes a request to confirm that said originator of said third electronic message did not use a false originating address, said fourth electronic message including said second data string and said portion of said third electronic message;
wherein the algorithm applied to the portion of the first electronic message is a first algorithm; and
the algorithm applied to the portion of the third electronic message is a second algorithm different from the first algorithm.

41. The method of claim 40 wherein said first electronic message includes one of an email, text message, VoIP message, or instant message.

42. The method of claim 40 wherein said portion of said first electronic message includes information contained in one or more of a message header, a message text, and a timestamp, of said first electronic message.

43. The method of claim 40 wherein said first data string is included in a message header of said first electronic message.

44. The method of claim 40 wherein said first data string is included in a message text of said first electronic message.

45. The method of claim 40 wherein said first data string includes a checksum for a message text of said first electronic message.

46. The method of claim 40 wherein said sending a second electronic message includes sending said second electronic message via port-to-port communication.

47. The method of claim 40 wherein said receiving a response to said second electronic message includes receiving said response via port-to-port communication.

48. The method of claim 40 wherein said receiving a response to said second electronic message includes receiving a return electronic message.

49. The method of claim 48, wherein said return electronic message is one of an email, text message, VoIP message, or instant message.

* * * * *